(12) United States Patent
Liu et al.

(10) Patent No.: US 12,610,182 B2
(45) Date of Patent: Apr. 21, 2026

(54) SMART DEVICE FOR REDUCING SOUND LEAKAGE, METHOD, AND SYSTEM, AND COMPUTER DEVICE

(71) Applicant: AAC Technologies (Nanjing) Co., Ltd., Nanjing (CN)

(72) Inventors: Kejia Liu, Nanjing (CN); Yufen Chu, Nanjing (CN); Yuheng Jiang, Nanjing (CN); Wenkai He, Nanjing (CN); Kang Zhang, Nanjing (CN)

(73) Assignee: AAG Technologies (Nanjing) Co., Ltd., Nanjing (CN)

( * ) Notice: Subject to any disclaimer, the term of this patent is extended or adjusted under 35 U.S.C. 154(b) by 159 days.

(21) Appl. No.: 18/402,689

(22) Filed: Jan. 2, 2024

(65) Prior Publication Data

US 2024/0414472 A1 Dec. 12, 2024

Related U.S. Application Data

(63) Continuation of application No. PCT/CN2023/099425, filed on Jun. 9, 2023.

(51) Int. Cl.
*H04R 1/32* (2006.01)
*G02B 27/01* (2006.01)
*G02C 11/00* (2006.01)

(52) U.S. Cl.
CPC ......... *H04R 1/323* (2013.01); *G02B 27/0176* (2013.01); *G02C 11/10* (2013.01); *G02B 2027/0163* (2013.01); *G02B 2027/0178* (2013.01); *H04R 2400/11* (2013.01)

(58) Field of Classification Search
CPC ..... H04R 1/323; G02B 27/0176; G02C 11/10
See application file for complete search history.

(56) References Cited

U.S. PATENT DOCUMENTS

| | | | |
|---|---|---|---|
| 2023/0229025 A1* | 7/2023 | Tong ..................... | G02C 11/10 |
| 2025/0020946 A1* | 1/2025 | Guo ..................... | G10K 11/178 |

FOREIGN PATENT DOCUMENTS

| | | | | | |
|---|---|---|---|---|---|
| CN | 113225643 A | * | 8/2021 | ............. | H04R 1/403 |
| CN | 113747326 A | * | 12/2021 | ............... | H04R 9/02 |

* cited by examiner

*Primary Examiner* — Devona E Faulk
(74) *Attorney, Agent, or Firm* — Wiersch Law Group

(57) ABSTRACT

A smart device for reducing sound leakage includes a frame, a main sound-generating device, an auxiliary sound-generating device, and a controller. The controller is configured to generate a control signal based on an electrical signal of the main sound-generating device to trigger the auxiliary sound-generating device to generate sound, so that the sound generated by the auxiliary sound-generating device and sound generated by the main sound-generating device through the sound outlet hole are superposed on each other, or the sound generated by the auxiliary sound-generating device and sound leakage generated by the main sound-generating device through the sound leakage hole form a dipole effect and counteract each other. The smart device according to the present disclosure can further reduce the sound leakage to improve privacy of the smart device for reducing sound leakage, which can also achieve an effect of improving sound quality.

7 Claims, 9 Drawing Sheets

100

100

3

33

A

A

A–A

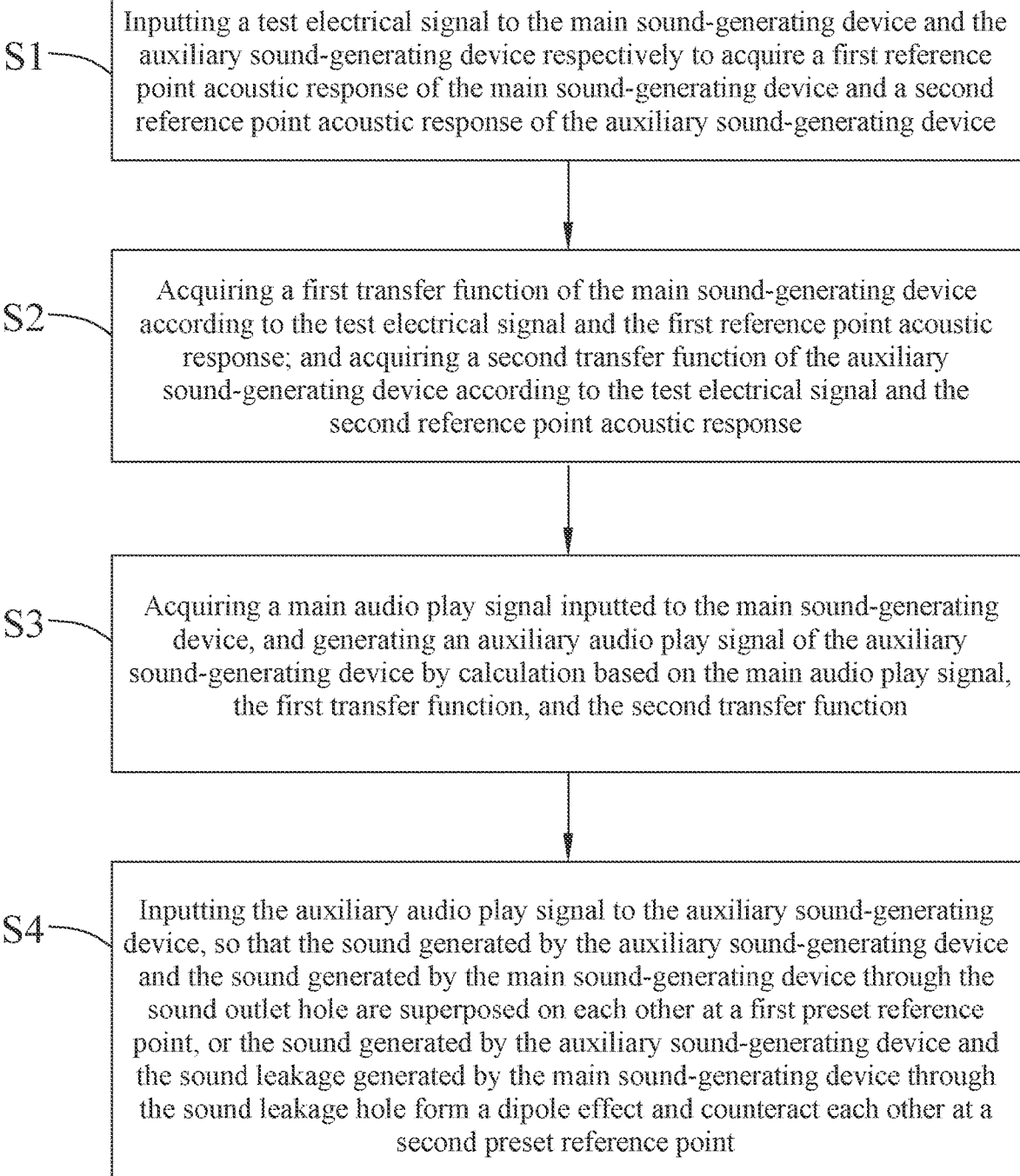

S1 — Inputting a test electrical signal to the main sound-generating device and the auxiliary sound-generating device respectively to acquire a first reference point acoustic response of the main sound-generating device and a second reference point acoustic response of the auxiliary sound-generating device S2 — Acquiring a first transfer function of the main sound-generating device according to the test electrical signal and the first reference point acoustic response; and acquiring a second transfer function of the auxiliary sound-generating device according to the test electrical signal and the second reference point acoustic response S3 — Acquiring a main audio play signal inputted to the main sound-generating device, and generating an auxiliary audio play signal of the auxiliary sound-generating device by calculation based on the main audio play signal, the first transfer function, and the second transfer function S4 — Inputting the auxiliary audio play signal to the auxiliary sound-generating device, so that the sound generated by the auxiliary sound-generating device and the sound generated by the main sound-generating device through the sound outlet hole are superposed on each other at a first preset reference point, or the sound generated by the auxiliary sound-generating device and the sound leakage generated by the main sound-generating device through the sound leakage hole form a dipole effect and counteract each other at a second preset reference point

FIG. 5

SMART DEVICE FOR REDUCING SOUND LEAKAGE, METHOD, AND SYSTEM, AND COMPUTER DEVICE

CROSS-REFERENCE TO RELATED APPLICATIONS

This application is a continuation of International Application No. PCT/CN2023/099425, filed on Jun. 9, 2023, which is hereby incorporated by reference in its entirety.

TECHNICAL FIELD

The present disclosure relates to the technical field of audio devices, and in particular, to a smart device for reducing sound leakage, method, and system, and a computer device.

BACKGROUND

With the rapid development of the electronics industry, a smart device with a play function is also rapidly emerging. That is, on the basis of a conventional smart device, structures such as a sound-generating device and a microphone are added to enable the smart device to play music and make calls, such as smart glasses, a virtual reality (VR) device, a mobile phone, a tablet computer, or the like.

For the smart device with the play function, in addition to the sound quality, a privacy requirement is also particularly important. That is, a user can hear played content clearly, but others cannot hear the played content clearly.

In the related art, the smart device with the play function mainly includes a frame and a sound-generating device arranged in the frame. A front sound cavity defined by the sound-generating device and the frame spaced apart generates sound through a sound outlet of the frame, a rear cavity jointly defined by the sound-generating device and the frame spaced apart is communicated with outside air through a sound leakage hole, and the smart device with the play function is communicated with the outside through the front sound cavity and the rear cavity respectively, so as to reduce sound leakage thereof by using a dipole effect, thereby improving privacy.

Although the smart device with the play function can reduce the sound leakage thereof through the dipole effect, since a dipole is not completely ideal, the outside can still hear the sound leakage to some extent. In addition, the smart device with the play function cannot improve the sound quality in an environment without others.

Therefore, it is necessary to provide a smart device for reducing sound leakage to solve the above technical problems.

SUMMARY

The technical problem to be solved in the present disclosure is to provide a smart device for reducing sound leakage, method, and system, and a computer device, to solve the problem in the related art that the smart device with the play function has sound leakage to some extent and cannot improve the sound quality without considering privacy.

In order to solve the above technical problem, in a first aspect, the present disclosure provides a smart device for reducing sound leakage. The smart device includes:

a frame, the frame being provided with a first accommo-dation cavity and a second accommodation cavity spaced apart, and a sound outlet hole and a sound leakage hole arranged on the frame and respectively connecting the first accommodation cavity with the outside, the sound leakage hole and the sound outlet hole being arranged opposite to each other on two opposite sides of the first accommodation cavity;

a main sound-generating device, the main sound-gener-ating device being fixed in the first accommodation cavity, and a sound-generating side of the main sound-generating device facing the sound outlet hole;

an auxiliary sound-generating device, the auxiliary sound-generating device being fixed in the second accommo-dation cavity; and a controller, the controller being installed on the smart device and electrically connected to the main sound-generating device and the auxiliary sound-generating device respectively, and configured to generate a con-trol signal based on an electrical signal of the main sound-generating device to trigger the auxiliary sound-generating device to generate sound, so that the sound generated by the auxiliary sound-generating device and sound generated by the main sound-generating device through the sound outlet hole are superposed on each other, or the sound generated by the auxiliary sound-generating device and sound leakage generated by the main sound-generating device through the sound leak-age hole form a dipole effect and counteract each other.

In an embodiment, the auxiliary sound-generating device is one of an electric speaker, an electrostatic speaker, an electromagnetic speaker, and a piezoelectric speaker.

In an embodiment, the smart device is one of smart glasses, a VR device, and a mobile phone.

In an embodiment, the smart device is smart glasses, the frame includes a lens frame and two temples connected to two opposite ends of the lens frame, two first accommoda-tion cavities are provided and are respectively arranged on each of the temples, and two second accommodation cavi-ties are provided and are respectively arranged on the temples and/or the lens frame.

In a second aspect, the present disclosure provides a method for reducing sound leakage applied to the above smart device for reducing sound leakage. The method for reducing sound leakage includes the following steps:

inputting a test electrical signal to the main sound-generating device and the auxiliary sound-generating device respectively to acquire a first reference point acoustic response of the main sound-generating device and a second reference point acoustic response of the auxiliary sound-generating device;

acquiring a first transfer function of the main sound-generating device according to the test electrical signal and the first reference point acoustic response; and acquiring a second transfer function of the auxiliary sound-generating device according to the test electrical signal and the second reference point acoustic response;

acquiring a main audio play signal inputted to the main sound-generating device, and generating an auxiliary audio play signal of the auxiliary sound-generating device by calculation based on the main audio play signal, the first transfer function, and the second trans-fer function; and inputting the auxiliary audio play signal to the auxiliary sound-generating device, so that the sound generated by the auxiliary sound-generating device and the sound generated by the main sound-generating device through the sound outlet hole are superposed on each other at a first preset reference point, or the sound generated by the auxiliary sound-generating device and the sound leakage generated by the main sound-generating device through the sound leakage hole form a dipole effect and counteract each other at a second preset reference point. In an embodiment, the first transfer function is:

$$S1 = T1/A;$$

where S1 denotes the first transfer function, T1 denotes the first reference point acoustic response, and A denotes the test electrical signal.

In an embodiment, the second transfer function is:

$$S2 = T2/A;$$

where S2 denotes the second transfer function, and T2 denotes the second reference point acoustic response.

In an embodiment, the auxiliary audio play signal is:

$$C = -B*S1/S2;$$

where C denotes the auxiliary audio play signal, and B denotes the main audio play signal.

In a third aspect, the present disclosure provides a system for reducing sound leakage. The system is applied to the above smart device for reducing sound leakage. The system for reducing sound leakage includes:

a first acquisition module configured to input a test electrical signal to the main sound-generating device and the auxiliary sound-generating device respectively to acquire a first reference point acoustic response of the main sound-generating device and a second reference point acoustic response of the auxiliary sound-generating device;

a second acquisition module configured to acquire a first transfer function of the main sound-generating device according to the test electrical signal and the first reference point acoustic response; and acquire a second transfer function of the auxiliary sound-generating device according to the test electrical signal and the second reference point acoustic response;

a calculation module configured to acquire a main audio play signal inputted to the main sound-generating device, and generate an auxiliary audio play signal of the auxiliary sound-generating device by calculation based on the main audio play signal, the first transfer function, and the second transfer function; and a control module configured to input the auxiliary audio play signal to the auxiliary sound-generating device, so that the sound generated by the auxiliary sound-generating device and the sound generated by the main sound-generating device through the sound outlet hole are superposed on each other at a first preset reference point, or the sound generated by the auxiliary sound-generating device and the sound leakage generated by the main sound-generating device through the sound leakage hole form a dipole effect and counteract each other at a second preset reference point.

In a fourth aspect, the present disclosure provides a computer device. The computer device includes a memory, a processor, and a sound leakage reducing program stored in the memory and executable by the processor, and the processor, when executing the sound leakage reducing program, implements the method for reducing sound leakage as described above.

Compared with the related art, according to the smart device for reducing sound leakage in the present disclosure, an auxiliary sound-generating device is added to the frame, so that non-ideal passive dipoles formed by the controlled auxiliary sound-generating device and the main sound-generating device can operate together to further counteract two sets of sound waves to form an active dipole, thereby further reducing the sound leakage and improving the privacy of the smart device for reducing sound leakage. In addition, the smart device for reducing sound leakage can also switch to a high-quality mode without considering privacy. That is, the auxiliary sound-generating device generates sound while the main sound-generating device generates sound, so that the two sets of sound waves are superposed at a human ear to achieve an effect of improving sound quality.

BRIEF DESCRIPTION OF DRAWINGS

In order to illustrate the technical solutions in the embodiments of the present disclosure more clearly, the accompanying drawings to be used in the description of the embodiments will be briefly introduced below. The accompanying drawings in the following description are only some embodiments of the present disclosure. For those skilled in the art, other accompanying drawings can be obtained based on these drawings. In the drawings.

FIG. 5 is a flowchart of steps of a method for reducing sound leakage according to an embodiment of the present disclosure;

Figure 1:
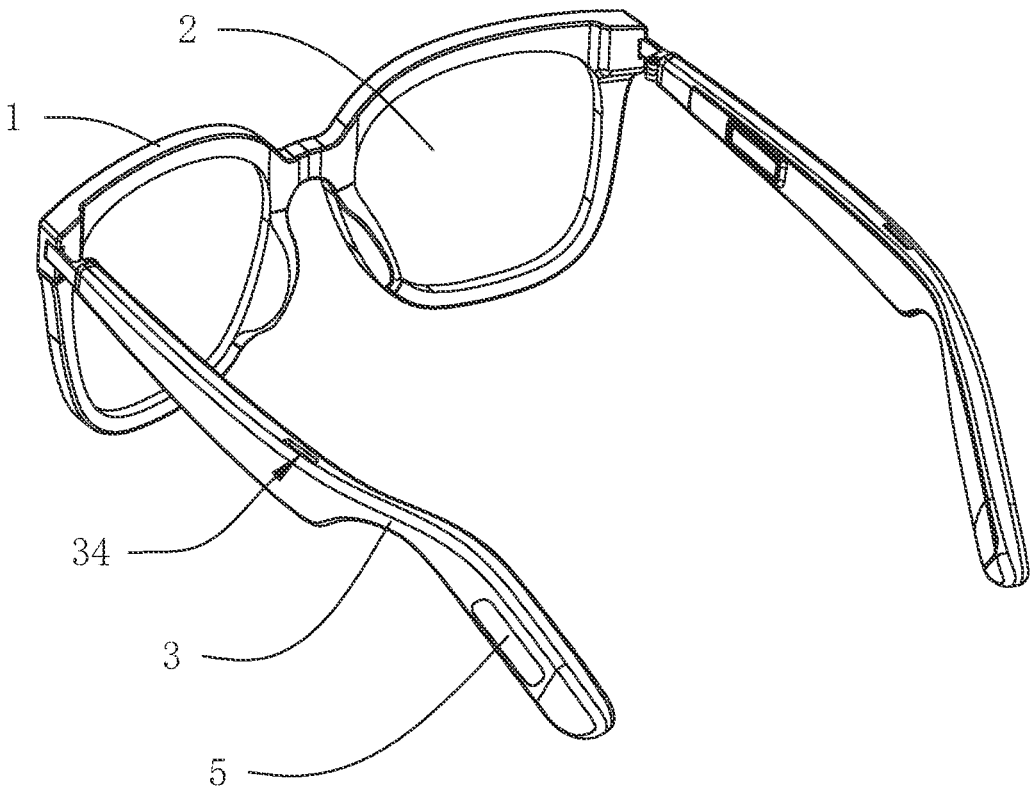
FIG. 1 is a schematic diagram of a three-dimensional structure of sound leakage reducing smart glasses according to an embodiment of the present disclosure.
Figure 2:
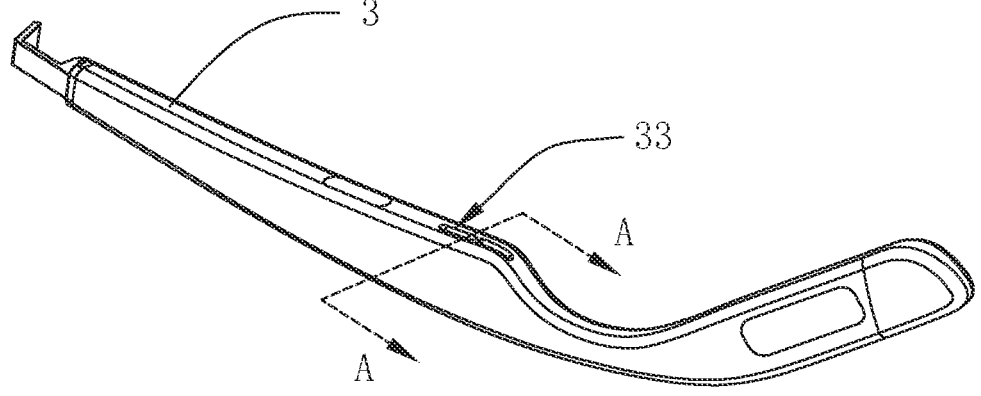
FIG. 2 is a schematic diagram of a temple structure in the sound leakage reducing smart glasses according to an embodiment of the present disclosure.
Figure 3:
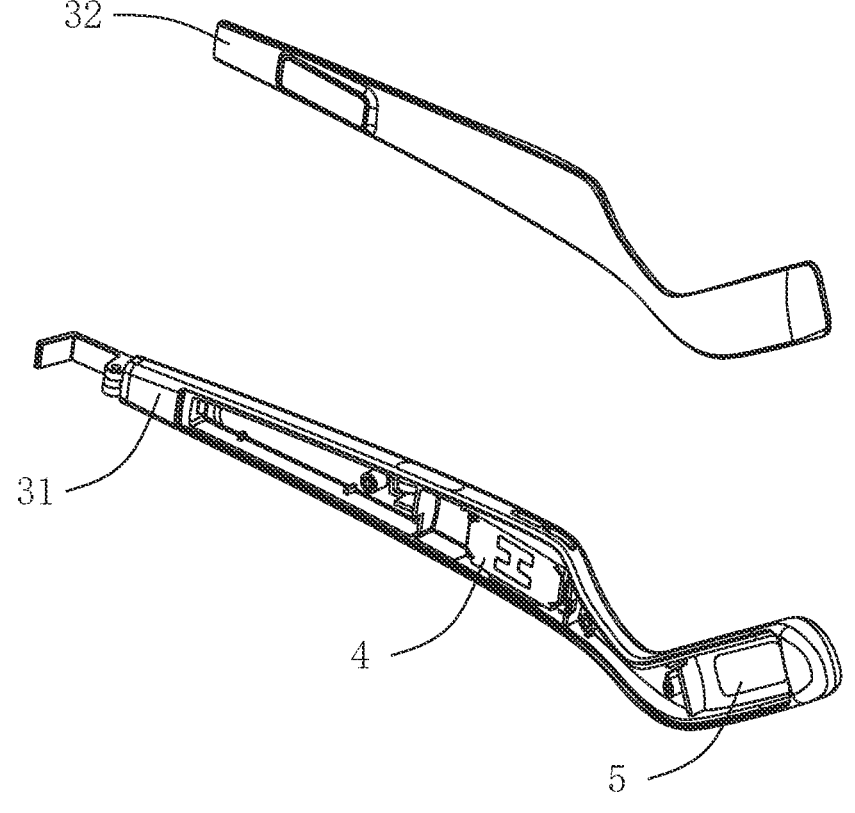
FIG. 3 is a schematic exploded view of the temple structure in the sound leakage reducing smart glasses according to an embodiment of the present disclosure.
Figure 4:
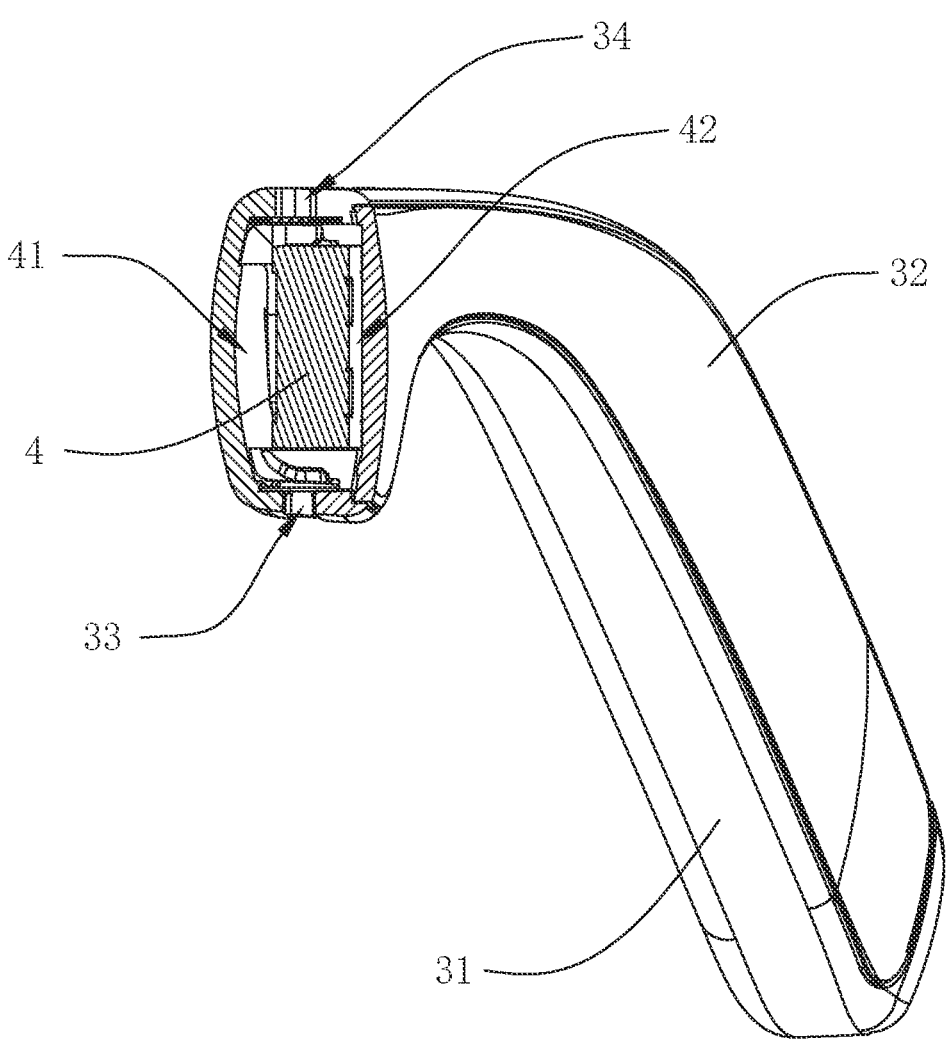
FIG. 4 is a sectional view taken along a line A-A in FIG. 2.

In the drawings, 100: sound leakage reducing smart glasses; 1: lens frame; 2: lens; 3: temple; 31: lower shell; 32: upper shell; 33: sound outlet hole; 34: sound leakage hole; 4: main sound-generating device; 41: front sound cavity; 42: rear cavity; 5: auxiliary sound-generating device.

200: system for reducing sound leakage; 201: first acquisition module; 202: second acquisition module; 203: third acquisition module; 204: control module.

DESCRIPTION OF EMBODIMENTS

The technical solutions in the embodiments of the present disclosure will be clearly and completely described below with reference to the accompanying drawings in the embodiments of the present disclosure. The described embodiments are only some of the embodiments of the present disclosure, but not all embodiments. Based on the embodiments of the present disclosure, all other embodiments obtained by those skilled in the art fall within the protection scope of the present disclosure.

Embodiment 1

This embodiment of the present disclosure provides a smart device for reducing sound leakage, including a frame, a main sound-generating device, an auxiliary sound-generating device, and a controller.

The frame is provided with a first accommodation cavity and a second accommodation cavity spaced apart, and a sound outlet hole and a sound leakage hole arranged on the frame and respectively connecting the first accommodation cavity with the outside. The sound leakage hole and the sound outlet hole are arranged opposite to each other on two opposite sides of the first accommodation cavity.

The main sound-generating device is fixed in the first accommodation cavity, and a sound-generating side of the main sound-generating device faces the sound outlet hole. The main sound-generating device and the frame are spaced apart and respectively define a front sound cavity and a rear cavity. The front sound cavity and the rear cavity are spaced apart and are not communicated with each other. The sound outlet hole connects the front sound cavity with the outside, and defines a front cavity together with the front sound cavity. The rear cavity is communicated with the outside through the sound leakage hole.

The auxiliary sound-generating device is fixed in the second accommodation cavity.

The controller is installed on the smart device and electrically connected to the main sound-generating device and the auxiliary sound-generating device respectively, and configured to generate a control signal based on an electrical signal of the main sound-generating device to trigger the auxiliary sound-generating device to generate sound, so that the sound generated by the auxiliary sound-generating device and sound generated by the main sound-generating device through the sound outlet hole are superposed on each other, or the sound generated by the auxiliary sound-generating device and sound leakage generated by the main sound-generating device through the sound leakage hole form a dipole effect and counteract each other.

In an embodiment, the smart device is one of smart glasses, a VR device, and a mobile phone. According to an actual requirement, another frame with a play function may alternatively be selected as the smart device.

In an embodiment, the auxiliary sound-generating device is one of an electric speaker, an electrostatic speaker, an electromagnetic speaker, and a piezoelectric speaker. Certainly, according to an actual requirement, other types of speakers may alternatively be selected as the auxiliary sound-generating device.

In an embodiment, the auxiliary sound-generating device may be one of an open-cavity structure, a closed-cavity structure, and a cavity-less structure. The open-cavity structure means that the main sound-generating device is arranged in a same manner as the frame. The closed-cavity structure means that two partial regions of the auxiliary sound-generating device are spaced apart from the frame respectively and define another front sound cavity and another rear cavity, but the frame is not provided with any hole body communicated with the front sound cavity and the rear cavity. The cavity-less structure is a cavity with no gap between the auxiliary sound-generating device and the frame. A sound-generating side of the auxiliary sound-generating device is directly exposed to the frame.

In an embodiment, a position of the auxiliary sound-generating device determined according to structural stacking, which, in extreme cases, may be arranged on an end portion of the frame or other regions that may not affect the use of the frame.

The technical effect of the smart device for reducing sound leakage is related to positions of reference points, which may be optimized in a weighted manner by selecting a plurality of reference points to cover different distances, positions, and the like.

In order to better reflect the structure of the smart device for reducing sound leakage, the following description is based on an example in which smart glasses are taken as the frame, referring to FIG. 1 to FIG. 4.

In sound leakage reducing smart glasses 100, a frame includes a lens frame 1, lenses 2 fixed to the lens frame 1, and two temples 3 respectively connected to two opposite ends of the lens frame 1. The sound leakage reducing smart glasses 100 further include a controller (not shown) installed in the temple 3 or the lens frame 1 (not shown). Each temple 3 includes a lower shell 31 and an upper shell 32 covering the lower shell 31.

Each temple 3 is provided with first accommodation cavities at intervals (not shown). The temple 3 and/or the lens frame 1 are/is provided with two second accommodation cavities (not shown). In this embodiment, the two temples 3 are each provided with a second accommodation cavity. Certainly, according to an actual requirement, one temple 3 is provided with one second accommodation cavity, and the lens frame 1 is provided with the other second accommodation cavity, or the two second accommodation cavities are both provided in the lens frame 1. A region of each temple 3 corresponding to the first accommodation cavity is provided with a sound outlet hole 33 and a sound leakage hole 34 spaced apart to connect the first accommodation cavity with the outside. Both the sound outlet hole 33 and the sound leakage hole 34 are arranged in the lower shell 31.

The main sound-generating device 4 is fixed to the first accommodation cavity and electrically connected to the controller. The main sound-generating device 4 and the lower shell 31 are spaced apart and together define a front sound cavity 41. The sound outlet hole 33 connects the front sound cavity 41 with the outside, and defines a front cavity together with the front sound cavity 41. Other partial regions of the main sound-generating device 4 and the upper shell 32 are spaced apart and together define a rear cavity 42, and the sound leakage hole 34 connects the rear cavity 42 with the outside. That is, the first accommodation cavity is arranged inside the temple 3.

The auxiliary sound-generating device 5 is fixed to the second accommodation cavity and electrically connected to the controller, with a sound-generating side exposed to the temple 3. That is, the second accommodation cavity is formed by inwardly recessing one side of the temple 3, which means that the auxiliary sound-generating device 5 has a cavity-less structure.

Compared with the related art, according to the smart device for reducing sound leakage in the present disclosure, an auxiliary sound-generating device is added to the frame, so that non-ideal passive dipoles formed by the controlled auxiliary sound-generating device and the main sound-generating device can operate together to further counteract two sets of sound waves to form an active dipole, thereby further reducing the sound leakage and improving the privacy of the smart device for reducing sound leakage. That is, when the main sound-generating device generates sound, the auxiliary sound-generating device is controlled to generate sound to counteract sound leakage of the main sound-generating device as much as possible, thereby greatly improving the privacy of the smart device for reducing sound leakage. In addition, the smart device for reducing sound leakage can be switched to a high-quality mode in situations where privacy is not considered (such as private rooms, or regions without outsiders). That is, the auxiliary sound-generating device generates sound while the main sound-generating device generates sound, so that the two sets of sound waves are superposed at a human ear to achieve an effect of improving sound quality.

Embodiment 2

This embodiment of the present disclosure provides a method for reducing sound leakage, which, referring to FIG. 5, is applied to the above smart device for reducing sound leakage in Embodiment 1. The method for reducing sound leakage includes the following steps.

In S1, a test electrical signal is inputted to the main sound-generating device and the auxiliary sound-generating device respectively to acquire a first reference point acoustic response of the main sound-generating device and a second reference point acoustic response of the auxiliary sound-generating device.

The test electrical signal is an input signal of the smart device for reducing sound leakage. In theory, a recognized wide-band signal may be used, and common signals such as frequency sweep, white noise or pink noise signals, may generally be used.

A reference point acoustic response is a frequency response of a sound-generating device, which is acquired by measuring through a microphone.

In S2, a first transfer function of the main sound-generating device is acquired according to the test electrical signal and the first reference point acoustic response; and a second transfer function of the auxiliary sound-generating device is acquired according to the test electrical signal and the second reference point acoustic response.

Figure 6:
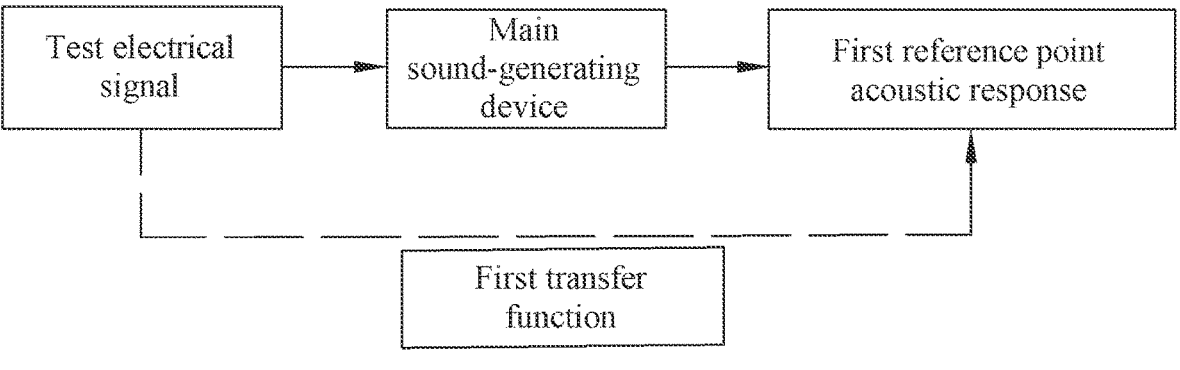
FIG. 6 is a schematic diagram of a relationship with a first transfer function in the method for reducing sound leakage according to an embodiment of the present disclosure.
Figure 7:
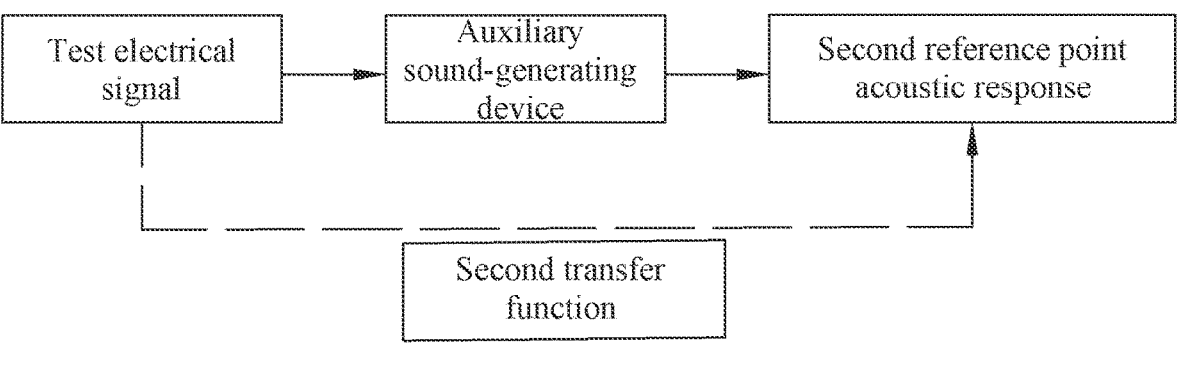
FIG. 7 is a schematic diagram of a relationship with a second transfer function in the method for reducing sound leakage according to an embodiment of the present disclosure.

A relationship between the test electrical signal, the first reference point acoustic response, the main sound-generating device, and the first transfer function is shown in FIG. 6. A relationship between the test electrical signal, the second reference point acoustic response, the auxiliary sound-generating device, and the second transfer function is shown in FIG. 7.

The first transfer function is an inherent property of an acoustic system and is only related to a system state, such as a relative position and placement, and is not affected by a driving signal.

In an embodiment, the first transfer function is:

$$S1 = T1/A;$$

where S1 denotes the first transfer function, T1 denotes the first reference point acoustic response, and A denotes the test electrical signal.

The second transfer function is similar to the first transfer function, and is not described in detail herein.

In an embodiment, the second transfer function is:

$$S2 = T2/A;$$

where S2 denotes the second transfer function, and T2 denotes the second reference point acoustic response.

In S3, a main audio play signal inputted to the main sound-generating device is acquired, and an auxiliary audio play signal of the auxiliary sound-generating device is generated by calculation based on the main audio play signal, the first transfer function, and the second transfer function.

The main audio play signal is any signal such as a call sound or a music signal.

In an embodiment, the auxiliary audio play signal is:

$$C = -B * S1/S2;$$

where C denotes the auxiliary audio play signal, and B denotes the main audio play signal.

Based on the auxiliary audio play signal generated according to the above formula (3), the sound generated by the two sound-generating devices can be counteracted as much as possible at an external reference point to reduce the sound leakage.

In S4, the auxiliary audio play signal is inputted to the auxiliary sound-generating device, so that the sound generated by the auxiliary sound-generating device and the sound generated by the main sound-generating device through the sound outlet hole are superposed on each other at a first preset reference point, or the sound generated by the auxiliary sound-generating device and the sound leakage generated by the main sound-generating device through the sound leakage hole form a dipole effect and counteract each other at a second preset reference point.

Figure 8:
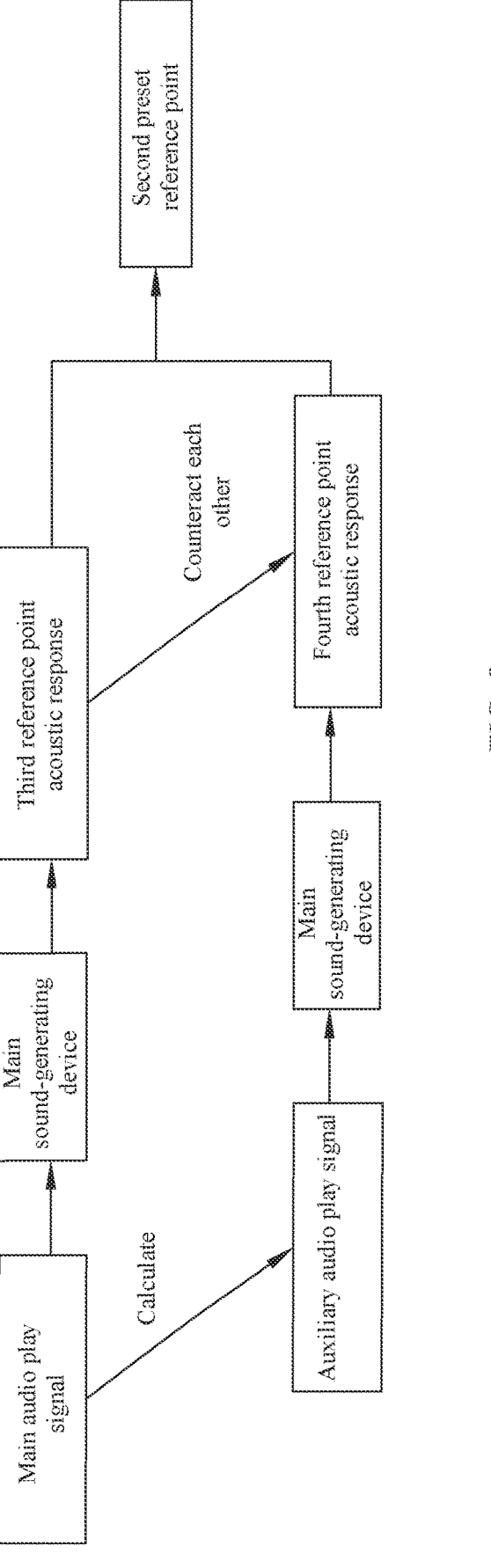
FIG. 8 is a schematic diagram of a sound-generating relationship between a main sound-generating device and an auxiliary sound-generating device in the method for reducing sound leakage according to an embodiment of the present disclosure.

As shown in FIG. 8, when the main sound-generating device generates sound based on the main audio play signal, an acoustic response (a third reference point acoustic response) may be generated at a corresponding reference point. At the same time, the auxiliary sound-generating device may generate sound based on the auxiliary audio play signal, and an acoustic response (a fourth reference point acoustic response) may be generated at a corresponding reference point. In this way, the acoustic response generated by the auxiliary sound-generating device and the acoustic response generated by the main sound-generating device may counteract each other at the second preset reference point, so as to generate a total acoustic response at another reference point, thereby reducing the sound leakage.

In addition, if privacy is not considered, the two sets of sound waves can be superposed on each other at the first preset reference point to achieve the effect of improving sound quality.

Since the method for reducing sound leakage in this embodiment is applied to the smart device for reducing sound leakage in Embodiment 1, the technical effect achieved by the smart device for reducing sound leakage in Embodiment 1 can also be achieved. Details are not described herein.

Embodiment 3

Figure 9:
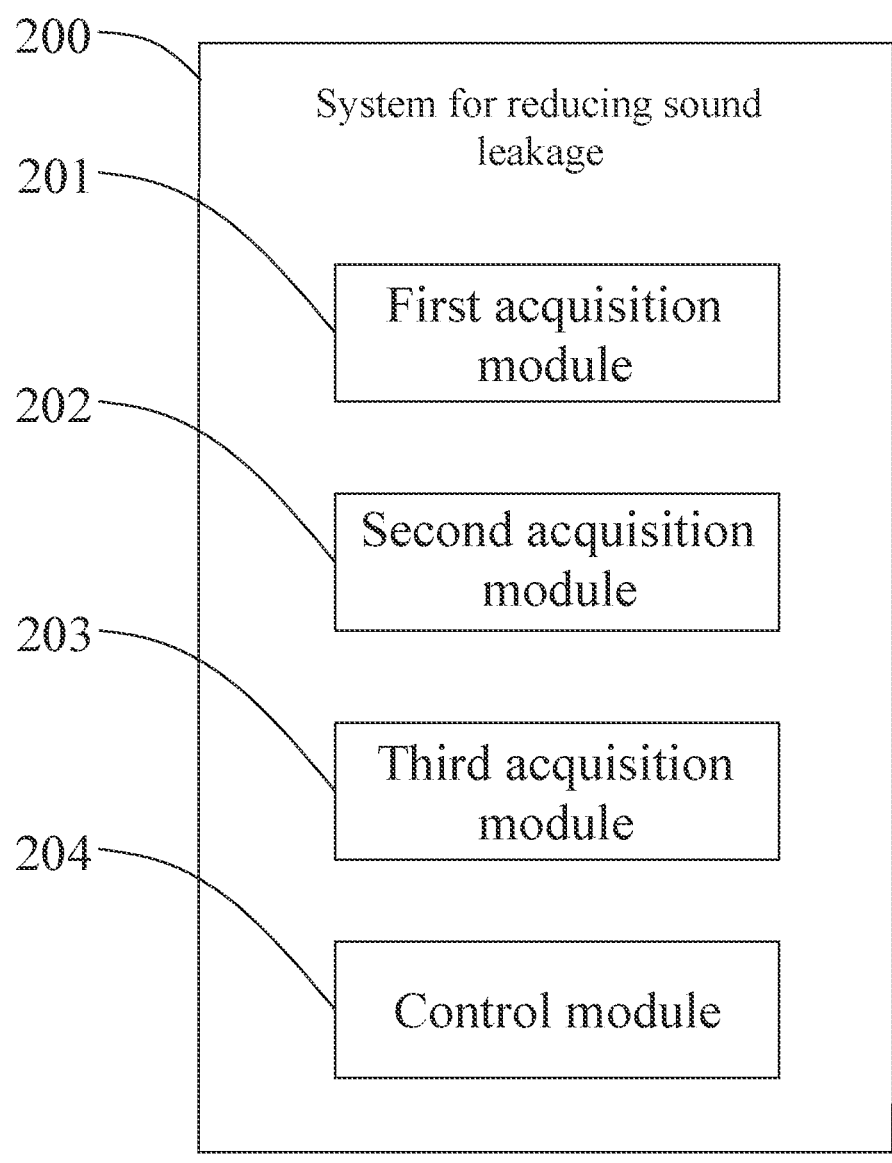
FIG. 9 is a schematic framework diagram of a system for reducing sound leakage according to an embodiment of the present disclosure.

This embodiment of the present disclosure provides a system for reducing sound leakage 200, which, referring to FIG. 9, is applied to the above smart device for reducing sound leakage in Embodiment 1. The system for reducing sound leakage 200 includes:

a first acquisition module 201 configured to input a test electrical signal to the main sound-generating device and the auxiliary sound-generating device respectively to acquire a first reference point acoustic response of the main sound-generating device and a second reference point acoustic response of the auxiliary sound-generating device;

a second acquisition module 202 configured to acquire a first transfer function of the main sound-generating device according to the test electrical signal and the first reference point acoustic response; and acquire a second transfer function of the auxiliary sound-generating device according to the test electrical signal and the second reference point acoustic response;

a calculation module 203 configured to acquire a main audio play signal inputted to the main sound-generating device, and generate an auxiliary audio play signal of the auxiliary sound-generating device by calculation based on the main audio play signal, the first transfer function, and the second transfer function; and a control module 204 configured to input the auxiliary audio play signal to the auxiliary sound-generating device, so that the sound generated by the auxiliary sound-generating device and the sound generated by the main sound-generating device through the sound outlet hole are superposed on each other at a first preset reference point, or the sound generated by the auxiliary sound-generating device and the sound leakage generated by the main sound-generating device through the sound leakage hole form a dipole effect and counteract each other at a second preset reference point.

Since the system for reducing sound leakage in this embodiment is applied to the smart device for reducing sound leakage in Embodiment 1, the technical effect achieved by the smart device for reducing sound leakage in Embodiment 1 can also be achieved. Details are not described herein.

Embodiment 4

This embodiment of the present disclosure provides a computer device, including a memory, a processor, and a sound leakage reducing program stored in the memory and executable by the processor. The processor, when executing the sound leakage reducing program, implements the method for reducing sound leakage in Embodiment 1.

Since the processor in the computer device in this embodiment performs the smart device for reducing sound leakage in Embodiment 2 when executing the sound leakage reducing program, the technical effect achieved by the method for reducing sound leakage in Embodiment 2 can also be achieved. Details are not described herein.

The above are merely the embodiments of the present disclosure. It should be noted herein that, for those skilled in the art, improvements can be made without departing from the creative concept of the present disclosure, but these all fall within the protection scope of the present disclosure.

What is claimed is:

1. A method for reducing sound leakage, applied to a smart device for reducing sound leakage, the smart device for reducing sound leakage comprising:

a frame, wherein the frame is provided with a first accommodation cavity and a second accommodation cavity that are spaced apart from each other, and a sound outlet hole and a sound leakage hole that are arranged on the frame and respectively connect the first accommodation cavity with the outside, the sound leakage hole and the sound outlet hole are arranged opposite to each other on two opposite sides of the first accommodation cavity;

a main sound-generating device fixed in the first accommodation cavity, wherein a sound-generating side of the main sound-generating device faces the sound outlet hole;

an auxiliary sound-generating device fixed in the second accommodation cavity; and a controller installed on the smart device and electrically connected to the main sound-generating device and the auxiliary sound-generating device, wherein the controller is configured to generate a control signal based on an electrical signal of the main sound-generating device to trigger the auxiliary sound-generating device to generate sound, so that the sound generated by the auxiliary sound-generating device and sound generated by the main sound-generating device through the sound outlet hole are superposed on each other, or the sound generated by the auxiliary sound-generating device and sound leakage generated by the main sound-generating device through the sound leakage hole form a dipole effect and counteract each other;

wherein the method for reducing sound leakage comprises the following steps:

inputting a test electrical signal to the main sound-generating device and the auxiliary sound-generating device respectively to acquire a first reference point acoustic response of the main sound-generating device and a second reference point acoustic response of the auxiliary sound-generating device;

acquiring a first transfer function of the main sound-generating device according to the test electrical signal and the first reference point acoustic response; and acquiring a second transfer function of the auxiliary sound-generating device according to the test electrical signal and the second reference point acoustic response;

acquiring a main audio play signal inputted to the main sound-generating device, and generating an auxiliary audio play signal of the auxiliary sound-generating device by calculation based on the main audio play signal, the first transfer function, and the second transfer function; and inputting the auxiliary audio play signal to the auxiliary sound-generating device, so that the sound generated by the auxiliary sound-generating device and the sound generated by the main sound-generating device through the sound outlet hole are superposed on each other at a first preset reference point, or the sound generated by the auxiliary sound-generating device and the sound leakage generated by the main sound-generating device through the sound leakage hole form a dipole effect and counteract each other at a second preset reference point.

2. The method for reducing sound leakage as described in claim 1, wherein the first transfer function is:

$$S1 = T1/A;$$

where S1 denotes the first transfer function, T1 denotes the first reference point acoustic response, and A denotes the test electrical signal.

3. The method for reducing sound leakage as described in claim 2, wherein the second transfer function is:

$$S2 = T2/A;$$

where S2 denotes the second transfer function, and T2 denotes the second reference point acoustic response.

4. The method for reducing sound leakage as described in claim 3, wherein the auxiliary audio play signal is:

$$C = -B * S1/S2;$$

where C denotes the auxiliary audio play signal, and B denotes the main audio play signal.

5. The method for reducing sound leakage as described in claim 1, wherein the auxiliary sound-generating device is one of an electric speaker, an electrostatic speaker, an electromagnetic speaker, or a piezoelectric speaker.

6. The method for reducing sound leakage as described in claim 1, wherein the smart device is one of smart glasses, a virtual reality (VR) device, or a mobile phone.

7. The method for reducing sound leakage as described in claim 1, wherein the smart device is smart glasses, the frame comprises a lens frame and two temples connected to two opposite ends of the lens frame, two first accommodation cavities are provided and are respectively arranged on the temples, and two second accommodation cavities are provided and are respectively arranged on the temples and/or the lens frame.

* * * * *